United States Patent
Kim et al.

(10) Patent No.: US 11,225,226 B1
(45) Date of Patent: Jan. 18, 2022

(54) OPERATION STABILIZATION SYSTEM FOR FOLDABLE PEDAL APPARATUS

(71) Applicants: HYUNDAI MOTOR COMPANY, Seoul (KR); KIA CORPORATION, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR)

(73) Assignees: HYUNDAI MOTOR COMPANY, Seoul (KR); KIA MOTORS CORPORATION, Seoul (KR); KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 17/337,901

(22) Filed: Jun. 3, 2021

(30) Foreign Application Priority Data

Nov. 18, 2020 (KR) ........................ 10-2020-0154486

(51) Int. Cl.
  *G05G 1/30* (2008.04)
  *B60T 7/04* (2006.01)
  *B60K 26/02* (2006.01)
  *B60T 17/18* (2006.01)
  *B60T 7/06* (2006.01)

(52) U.S. Cl.
  CPC .............. *B60T 7/042* (2013.01); *B60K 26/02* (2013.01); *B60T 7/065* (2013.01); *B60T 17/18* (2013.01); *B60K 2026/026* (2013.01); *B60T 2220/04* (2013.01)

(58) Field of Classification Search
  CPC .............. B60R 21/09; B60K 2026/026; B60K 2026/024; B60K 26/02; B60T 7/065; B60T 7/06; B60T 7/04; G05G 1/405; G05G 1/40; G05G 1/445; G05G 1/44; G05G 1/38; G05G 1/32; G05G 1/30
  See application file for complete search history.

(56) References Cited

U.S. PATENT DOCUMENTS 2,281,117 A * 4/1942 Sladky ..................... G05G 1/30
  74/513
6,182,525 B1 * 2/2001 Bowers .................. B60K 20/02
  180/274

(Continued)

FOREIGN PATENT DOCUMENTS

KR 10-2017-0137427 A 12/2017

*Primary Examiner* — Richard W Ridley
*Assistant Examiner* — Brian J McGovern
(74) *Attorney, Agent, or Firm* — Morgan, Lewis & Bockius LLP

(57) ABSTRACT

An operation stabilization system for a foldable pedal apparatus of a vehicle includes: a first battery and a second battery disposed in the vehicle; a first vehicle controller and a second vehicle controller receiving power from the first battery and the second battery, respectively, and transmitting operation signals, respectively; a foldable pedal controller disposed in the foldable pedal apparatus to generate control signals by receiving the signals from the first vehicle controller and the second vehicle controller; and a first motor and a second motor disposed in the foldable pedal apparatus and connected to the first battery and the second battery to receive the power from the first and second batteries, respectively.

20 Claims, 7 Drawing Sheets

(56) References Cited

U.S. PATENT DOCUMENTS

| | | | | |
|---|---|---|---|---|
| 6,318,208 | B1* | 11/2001 | Thongs, Jr. | G05G 1/38 |
| | | | | 74/513 |
| 6,364,047 | B1* | 4/2002 | Bortolon | B60K 23/02 |
| | | | | 180/334 |
| 10,214,104 | B1* | 2/2019 | Jaradi | G05G 1/44 |
| 10,906,514 | B1* | 2/2021 | Kim | G05G 1/40 |
| 10,946,741 | B1* | 3/2021 | Kim | B60T 7/06 |
| 10,994,611 | B1* | 5/2021 | Kim | B60K 26/02 |
| 11,021,058 | B1* | 6/2021 | Kim | G05G 5/03 |
| 2007/0137397 | A1* | 6/2007 | Choi | G05G 1/36 |
| | | | | 74/512 |
| 2009/0223319 | A1* | 9/2009 | Choi | G05G 1/405 |
| | | | | 74/512 |
| 2011/0132134 | A1* | 6/2011 | Kim | F02D 11/02 |
| | | | | 74/514 |
| 2012/0132028 | A1* | 5/2012 | Kim | G05G 1/405 |
| | | | | 74/512 |
| 2017/0225570 | A1* | 8/2017 | El Aile | B60R 7/06 |
| 2019/0310678 | A1* | 10/2019 | Wojciechowski | B60K 26/021 |
| 2020/0257329 | A1* | 8/2020 | Kihara | B60K 26/02 |
| 2020/0317152 | A1* | 10/2020 | Ghaffari | G05D 1/0061 |
| 2020/0317166 | A1* | 10/2020 | Ghaffari | B60K 26/02 |
| 2020/0317167 | A1* | 10/2020 | Ghaffari | B60T 7/06 |
| 2021/0004040 | A1* | 1/2021 | Dohmen | G05G 5/05 |
| 2021/0109560 | A1* | 4/2021 | Ford | B60K 26/021 |
| 2021/0331584 | A1* | 10/2021 | Kim | B60T 7/06 |

* cited by examiner

<POP-UP POSITION>

OPERATION STABILIZATION SYSTEM FOR FOLDABLE PEDAL APPARATUS

CROSS REFERENCE TO RELATED APPLICATION

The present application claims priority to Korean Patent Application No. 10-2020-0154486, filed Nov. 18, 2020 in the Korean Intellectual Property Office, the entire contents of which is incorporated herein for all purposes by this reference.

TECHNICAL FIELD

The present disclosure generally relates to an operation stabilization system for a foldable pedal apparatus, and more particularly, to an operation stabilization system for a foldable pedal apparatus, the operation stabilization system being able to improve operation stability using two independent batteries, two independent motors, and two independent stroke sensors.

BACKGROUND

Autonomous driving technology enables a vehicle to autonomously travel to a destination without requiring a driver to manually operate a steering wheel, an accelerator pedal, a brake, or the like. Recently, the development of such autonomous driving vehicles is actively underway.

When autonomous driving is generally performed, a driver may select one mode from a manual driving mode in which the driver manually drives a vehicle to a destination and an autonomous driving mode in which the vehicle drives itself to the destination so that the driver does not need to drive the vehicle.

In the autonomous driving mode, the driver may take a rest by stretching legs. However, when pedals (e.g. the accelerator pedal and the brake pedal) provided in the space below and in front of the driver's seat are exposed to the interior of the cabin, the rest of the driver may be disturbed. In particular, when the pad of a pedal device is erroneously operated, the autonomous driving may be forcibly stopped, thereby increasing the risk of an accident.

Therefore, the development of foldable pedal devices (e.g. an accelerator pedal device and a brake pedal device) in autonomous driving vehicle has been undertaken such that the pad of each pedal device extends and is exposed toward a driver in the manual driving mode in which the driver manually drives a vehicle so that the pedal device may be operated by the driver or the pad of the pedal device is hidden and does not extend toward the driver so as not to be operated by the driver so that the driver may take a comfortable rest and erroneous operation may be prevented.

In addition, a pop-up operation of extending the pad of the pedal device so as to be exposed toward the driver and a hiding operation of hiding the pad of the pedal device so as not to extend toward the driver are performed by the operation of a motor using the power of a battery. In the related art, a fail-safe function has not been expected, since there has been provided a single system including the battery and the motor. Thus, there is a problem in that the stabilization of the foldable pedal device is significantly lowered.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an operation stabilization system for a foldable pedal apparatus, the operation stabilization system being able to improve operation stability using two independent batteries, two independent motors, and two independent stroke sensors, thereby preventing the risk of an accident that would be caused by a malfunction.

In order to achieve the above objective, according to an aspect of the present disclosure, there is provided an operation stabilization system for a foldable pedal apparatus of a vehicle, the operation stabilization system including: a first battery and a second battery disposed in the vehicle; a first vehicle controller and a second vehicle controller receiving power from the first battery and the second battery, respectively, and transmitting operation signals, respectively; a foldable pedal controller disposed in the foldable pedal apparatus to generate control signals by receiving the signals from the first vehicle controller and the second vehicle controller; a first motor and a second motor disposed in the foldable pedal apparatus and connected to the first battery and the second battery to receive the power from the first and second batteries, respectively, wherein the first motor and the second motor respectively operate by receiving the control signals from the foldable pedal controller; and a pedal driving unit disposed in the foldable pedal apparatus, operating by receiving the power from the first motor and the second motor, and when operating, driving a pedal pad of the foldable pedal apparatus to pivot with respect to a pedal housing so that the pedal pad pops up or is hidden.

The operation stabilization system may further include a first stroke sensor and a second stroke sensor disposed in the foldable pedal apparatus and connected to the first battery and the second battery, respectively.

The foldable pedal controller may include a single foldable pedal controller, with a control area thereof being divided into a first controller and a second controller. The first controller may receive the signal from the first vehicle controller and transmits an operation control signal to the first motor and the second controller receives the signal from the second vehicle controller and transmits an operation control signal to the second motor.

The pedal driving unit may include: a first gear coupled to the first motor; a second gear coupled to the second motor; a common gear connecting the first gear and the second gear; a lead screw coupled to a central portion of the common gear; a support member screw-coupled to the lead screw to extend and retract in a longitudinal direction of the lead screw following rotation of the lead screw; a pivot member pivotably coupled to the pedal housing and configured to be supported by the support member when the support member has extended and be released from being supported by the support member when the support member has retracted; and a connecting link connecting the pivot member and the pedal pad to each other.

When the support member has extended to support the pivot member, the pedal pad may pivot to extend from the pedal housing, thereby moving to a pop-up position. When the support member has retracted to be released from a position supporting the pivot member, the pedal pad may pivot to be inserted into the pedal housing, thereby moving to a hidden position.

When a manual driving mode signal is generated in an autonomous driving situation, the first vehicle controller may receive the power from the first battery and transmits the operation signal to the first controller of the foldable pedal controller while the second vehicle controller receives the power from the second battery and transmits the operation signal to the second controller of the foldable pedal controller. The first controller of the foldable pedal controller may transmit the operation control signal to the first motor and the second controller of the foldable pedal controller transmits the control operation signal to the second motor. The pedal pad of the foldable pedal apparatus may be moved to a pop-up position or remain in a hidden position depending on whether or not the first motor and the second motor operate.

The first controller and the second controller of the foldable pedal controller may determine whether or not the first motor and the second motor are operating, respectively. When the first motor and the second motor operate simultaneously, the first motor and the second motor may operate by sharing 50% of torque necessary for an operation of the pedal driving unit under control of the first controller and the second controller of the foldable pedal controller. In response to the first motor and the second motor operating simultaneously, the pedal pad of the foldable pedal apparatus may be moved to the pop-up position.

The first controller and the second controller of the foldable pedal controller may determine whether or not the first motor and the second motor are operating, respectively. When one motor of the first motor and the second motor is operating, 100% of the torque may be applied to the operating motor under control of the foldable pedal controller and the pedal pad of the foldable pedal apparatus may be moved to the pop-up position.

When one motor of the first motor and the second motor is operating, a warning system of the vehicle may be operated under control of the first vehicle controller and the second vehicle controller.

The first controller and the second controller of the foldable pedal controller may determine whether or not the first motor and the second motor are operating, respectively. When neither the first motor nor the second motor is operating, a control logic necessary for a pop-up operation of the pedal pad may be ended under control of the foldable pedal controller, a warning system of the vehicle may be operated under control of the first vehicle controller and the second vehicle controller, and the vehicle may remain in autonomous driving mode.

After the pedal pad of the foldable pedal apparatus is moved to the pop-up position, when the pedal pad is pivoted by being operated by a driver, the pedal pad may remain in the pop-up position or be moved to the hidden position depending on output states of the first stroke sensor and the second stroke sensor.

The first controller and the second controller of the foldable pedal controller may determine the output states of the first stroke sensor and the second stroke sensor. When an output value of the first stroke sensor and an output value of the second stroke sensor are the same, the pedal pad may remain in the pop-up position under control of the first controller and the second controller of the foldable pedal controller and the vehicle may ordinarily drive in manual driving mode. When the output value of the first stroke sensor and the output value of the second stroke sensor are different, the pedal pad may be moved to the hidden position under control of the first controller and the second controller of the foldable pedal controller and the vehicle may drive in autonomous driving mode.

According to another aspect of the present disclosure, there is provided an operation stabilization system for a foldable pedal apparatus of a vehicle, the operation stabilization system including: a first battery and a second battery disposed in the vehicle; a vehicle controller including a first controller receiving power from the first battery and transmitting an operation signal and a second controller receiving power from the second battery and transmitting an operation signal; a foldable pedal controller disposed in the foldable pedal apparatus and including a first controller generating a control signal by receiving a signal from the first controller of the vehicle controller and a second controller generating a control signal by receiving a signal from the second controller of the vehicle controller; a first motor and a second motor disposed in the foldable pedal apparatus and connected to the first battery and the second battery to receive the power from the first and second batteries, respectively, wherein the first motor and the second motor respectively operate by receiving the control signals from the foldable pedal controller; a pedal driving unit disposed in the foldable pedal apparatus, operating by receiving the power from the first motor and the second motor, and when operating, driving a pedal pad of the foldable pedal apparatus to pivot with respect to a pedal housing so that the pedal pad pops up or is hidden; and a first stroke sensor and a second stroke sensor disposed in the foldable pedal apparatus and connected to the first battery and the second battery, respectively.

The pedal driving unit may include: a first gear coupled to the first motor; a second gear coupled to the second motor; a common gear connecting the first gear and the second gear; a lead screw coupled to a central portion of the common gear; a support member screw-coupled to the lead screw to extend and retract in a longitudinal direction of the lead screw following rotation of the lead screw; a pivot member pivotably coupled to the pedal housing and configured to be supported by the support member when the support member has extended and be released from being supported by the support member when the support member has retracted; and a connecting link connecting the pivot member and the pedal pad to each other.

When a manual driving mode signal is generated in an autonomous driving situation, the first controller of the vehicle controller may receive the power from the first battery and transmit the operation signal to the first controller of the foldable pedal controller while the second controller of the vehicle controller receives the power from the second battery and transmits the operation signal to the second controller of the foldable pedal controller. The first controller of the foldable pedal controller may transmit the operation control signal to the first motor and the second controller of the foldable pedal controller may transmit the control operation signal to the second motor. The pedal pad of the foldable pedal apparatus may be moved to a pop-up position or may remain in a hidden position depending on whether or not the first motor and the second motor operate.

The first controller and the second controller of the foldable pedal controller may determine whether or not the first motor and the second motor are operating, respectively. When the first motor and the second motor operate simultaneously, the first motor and the second motor may operate by sharing 50% of torque necessary for an operation of the pedal driving unit under control of the first controller and the second controller of the foldable pedal controller. In response to the first motor and the second motor operating simultaneously, the pedal pad of the foldable pedal apparatus may be moved to the pop-up position.

The first controller and the second controller of the foldable pedal controller may determine whether or not the first motor and the second motor are operating, respectively. When one motor of the first motor and the second motor is operating, 100% of the torque may be applied to the operating motor under control of the foldable pedal controller and the pedal pad of the foldable pedal apparatus may be moved to the pop-up position.

The first controller and the second controller of the foldable pedal controller may determine whether or not the first motor and the second motor are operating, respectively. When neither the first motor nor the second motor is operating, a control logic necessary for a pop-up operation of the pedal pad may be ended under control of the foldable pedal controller, and the vehicle may remain in autonomous driving mode.

After the pedal pad of the foldable pedal apparatus is moved to the pop-up position, when the pedal pad is pivoted by being operated by a driver, the pedal pad may remain in the pop-up position or may be moved to the hidden position depending on output states of the first stroke sensor and the second stroke sensor.

The first controller and the second controller of the foldable pedal controller may determine the output states of the first stroke sensor and the second stroke sensor. When an output value of the first stroke sensor and an output value of the second stroke sensor are the same, the pedal pad may remain in the pop-up position under control of the first controller and the second controller of the foldable pedal controller and the vehicle may ordinarily drive in manual driving mode. When the output value of the first stroke sensor and the output value of the second stroke sensor are different, the pedal pad may be moved to the hidden position under control of the first controller and the second controller of the foldable pedal controller and the vehicle may drive in autonomous driving mode.

The operation stabilization system for a foldable pedal apparatus according to the present disclosure may improve operation stability using two independent batteries, two independent motors, and two independent stroke sensors, thereby preventing the risk of an accident that would be caused by a malfunction.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
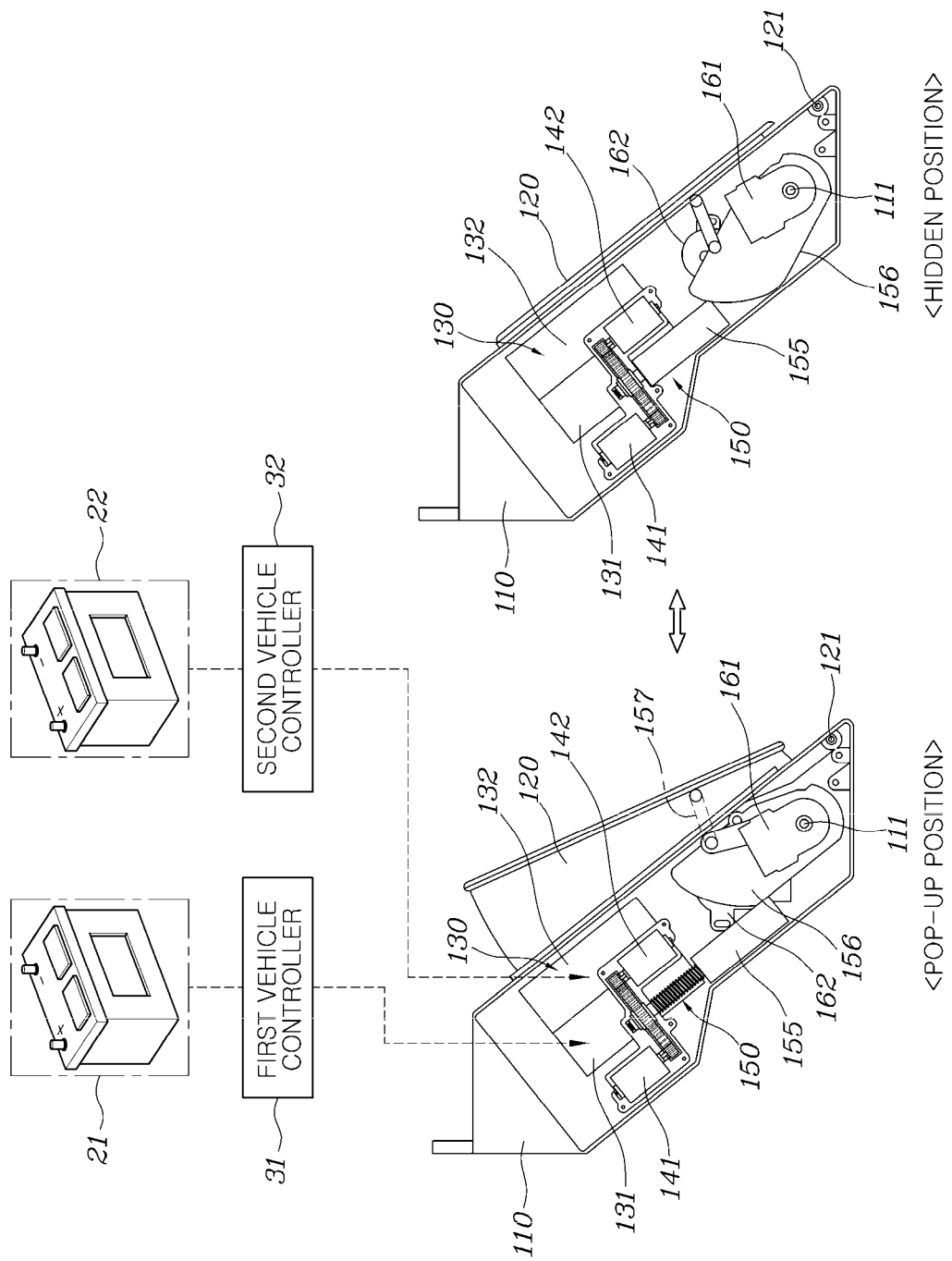
FIG. 1 is a diagram illustrating a schematic configuration of an operation stabilization system for a foldable pedal apparatus according to a first embodiment of the present disclosure.
Figure 2:
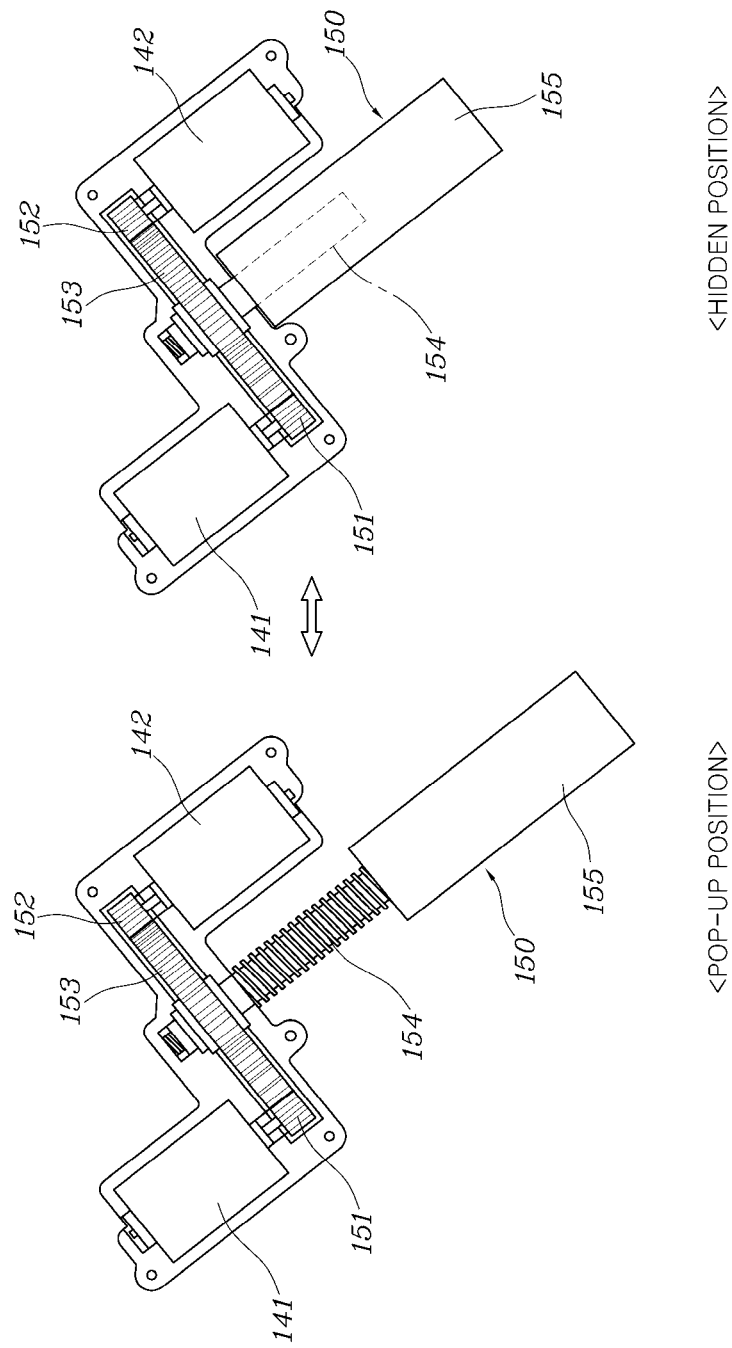
FIG. 2 is a diagram illustrating the pedal operating unit of the present disclosure.
Figure 3:
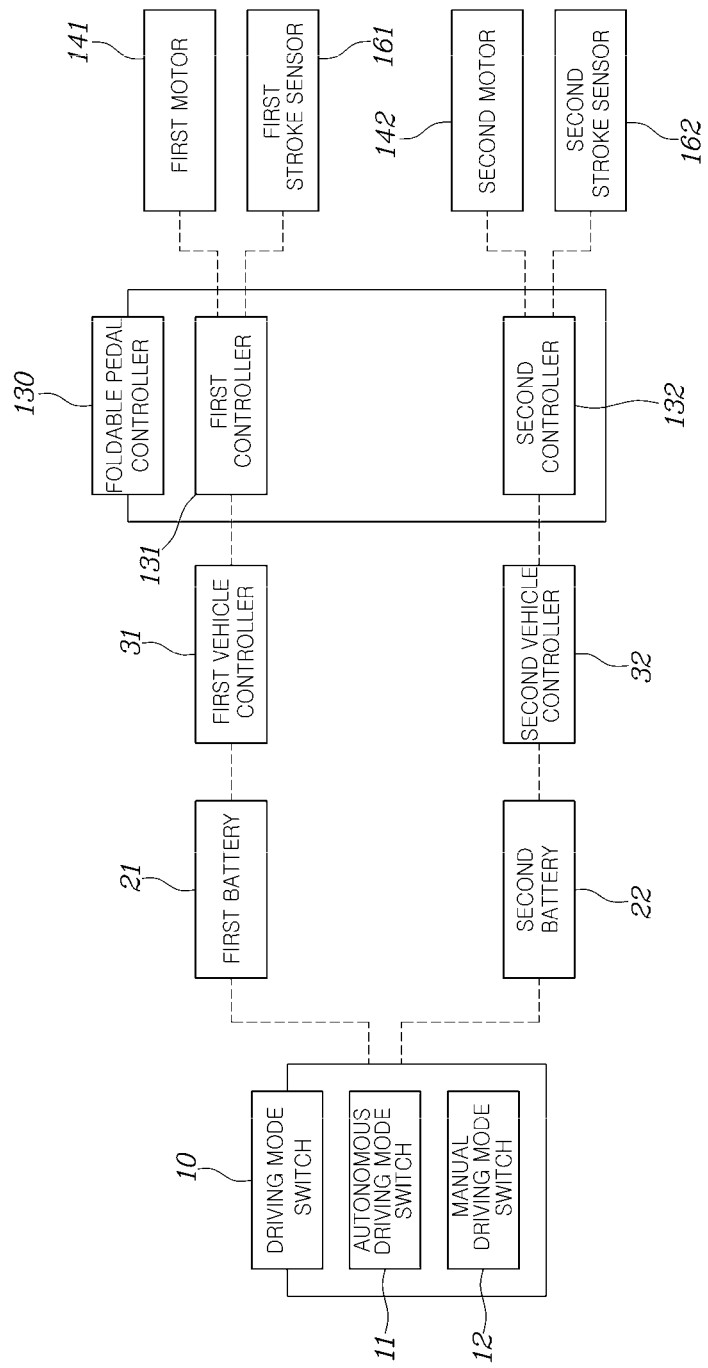
FIGS. 3 and 4 are a block diagram and a flowchart, respectively, illustrating the first embodiment of the present disclosure.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The controller according to exemplary embodiments of the present disclosure may be implemented using a non-volatile memory (not shown) configured to store data regarding an algorithm for controlling the operations of a variety of components of a vehicle or software instructions for reproducing the algorithm and a processor (not shown) configured to execute the following operations using the data stored in the memory. The memory and the process may be implemented as separate chips, respectively. As an alternative, the memory and the processor may be implemented as a single integrated chip. The processor may be one or more processors.

Hereinafter, an operation stabilization system for a foldable pedal apparatus according to a first exemplary embodiment of the present disclosure will be described in detail with reference to FIGS. 1 to 4.

In an autonomous driving vehicle, a driver may select one mode from manual driving mode in which the driver manually drives a vehicle and autonomous driving mode in which the driver does not manually drive the vehicle but the vehicle drives to a destination by itself.

That is, the driving mode of the autonomous driving vehicle may be changed, for example, in response to the operation of a driving mode switch 10. The driving mode switch 10 may include an autonomous driving mode switch 11 and a manual driving mode switch 12.

The driving mode switch 10 is connected to a first battery 21 and a second battery 22 provided in the autonomous driving vehicle. The first battery 21 and the second battery 22 are connected to a first vehicle controller 31 and a second vehicle controller 32 provided in the autonomous driving vehicle, respectively.

The first vehicle controller 31 and the second vehicle controller 32 generate operation signals by receiving power from the first battery 21 and the second battery 22, respectively.

The operation signals generated by the first vehicle controller 31 and the second vehicle controller 32 are transferred to the foldable pedal apparatus.

The foldable pedal apparatus may be a foldable accelerator pedal device or a foldable brake pedal device.

The foldable pedal apparatus may include: a pedal housing 110 fixedly disposed in a space below and in front of the driver's seat; a pedal pad 120 pivotably coupled to the pedal housing 110 and being operable by a foot of a driver; a foldable pedal controller 130 generating control signals by receiving the signals from the first vehicle controller 31 and the second vehicle controller 32; a first motor 141 and a second motor 142 connected to the first battery 21 and the second battery 22 to receive power therefrom, respectively, wherein the first motor 141 and the second motor 142 respectively operate by receiving the control signals from the foldable pedal controller 130; a pedal driving unit 150 operating by receiving the power from the first motor 141 and the second motor 142, and when operating, driving the pedal pad 120 to pivot with respect to the pedal housing 110 so that the pedal pad 120 pops up or is hidden; and a first stroke sensor 161 and a second stroke sensor 162 connected to the first battery 21 and the second battery 22, respectively.

The pedal housing 110 has the shape of a hollow box, with the foldable pedal controller 130, the first motor 141 and the second motor 142, the pedal driving unit 150, and the like being disposed within the internal space thereof.

The pedal pad 120 may be an organ-type pad, with the bottom end thereof being pivotably coupled to the pedal housing 110 via a hinge pin 121, and the top end thereof being pivotable in a forward-backward direction about the hinge pin 121 on the bottom end.

The foldable pedal controller 130 may be a single controller, with the control area thereof being divided into a first controller 131 and a second controller 132.

The first controller 131 receives the signal from the first vehicle controller 31 and transmits an operation control signal to the first motor 141. The second controller 132 receives the signal from the second vehicle controller 32 and transmits an operation control signal to the second motor 142.

Each of the first motor 141 and the second motor 142 may be a rotary motor. The rotary motor may be a stepper motor. The first motor 141 and the second motor 142 may be configured to receive power from the first battery 21 and the second battery 22, respectively.

The pedal driving unit 150 includes: a first gear 151 coupled to the first motor 141; a second gear 152 coupled to the second motor 142; a common gear 153 connecting the first gear 151 and the second gear 152; a lead screw 154 coupled to the central portion of the common gear 153; a support member 155 screw-coupled to the lead screw 154 to extend and retract in the longitudinal direction of the lead screw 154 following the rotation of the lead screw 154; a pivot member 156 pivotably coupled to the pedal housing 110 and configured to be supported by the support member 155 when the support member 155 has extended and be released from being supported by the support member 155 when the support member 155 has retracted; and a connecting link 157 connecting the pivot member 156 and the pedal pad 120 to each other.

One end of the pivot member 156 is pivotably coupled to a fixed shaft 111 of the pedal housing 110. The pivot member 156 is connected to the pedal pad 120 via the connecting link 157. The pivot member 156 may be a hysteresis module able to generate hysteresis when the pedal pad 120 is operated by the driver.

The pedal pad 120 may be moved between a hidden position in which the pedal pad 120 has been inserted into the pedal housing 110 and a pop-up position in which the pedal pad 120 has extended from the pedal housing 110, in response to the pivoting of the pivot member 156 caused by the extending and retracting of the support member 155.

That is, when the first gear 151, the second gear 152, and the common gear 153 are rotated by the operation of the first motor 141 and the second motor 142, the lead screw 154 coupled to the common gear 153 rotates. Following the rotation of the lead screw 154, the support member 155 screw-coupled to the lead screw 154 extends and retracts in the longitudinal direction of the lead screw 154 while being guided by the pedal housing 110.

When the support member 155 has extended to be inserted between the pedal housing 110 and the pivot member 156, the support member 155 that has extended is in a position supporting the pivot member 156, and the pedal pad 120 has extended from the pedal housing 110 to be in the pop-up position. From this point in time, the pedal pad 120 may be operated by the driver (refer to Pop-up Position in FIGS. 1 and 2.)

When the support member 155 has retracted so as to be released from the position supporting the pivot member 156, the pedal pad 120 pivots into the pedal housing 110, thereby moving to the hidden position. In this position, the pedal pad 120 is not operable by the driver (refer to the Hidden Position in FIGS. 1 and 2.)

A return spring is provided such that both ends thereof are supported on the pedal housing 110 and the pivot member 156. When the support member 155 retracts so as to be released from the position supporting the pivot member 156, the pivot member 156 is pivoted by the elastic force of the return spring, in a direction in which the pivot member 156 is inserted into the pedal housing 110. At this time, the pedal pad 120 connected to the pivot member 156 via the connecting link 157 is also pivoted to be inserted into the pedal housing 110, thereby moving to the hidden position.

The first stroke sensor 161 and the second stroke sensor 162 are fixedly coupled to left and right portions of the pedal housing 110, respectively. The first stroke sensor 161 and the second stroke sensor 162 are connected to the pedal pad 120 via links, respectively. When the pedal pad 120 is operated by the driver, the first stroke sensor 161 and the second stroke sensor 162 serve to detect an initial position (i.e. a return position) of the pedal pad 120. In addition, each of the first stroke sensor 161 and the second stroke sensor 162 may perform an assistance function of an accelerator pedal sensor (APS) or a brake pedal sensor (BPS).

Figure 4:
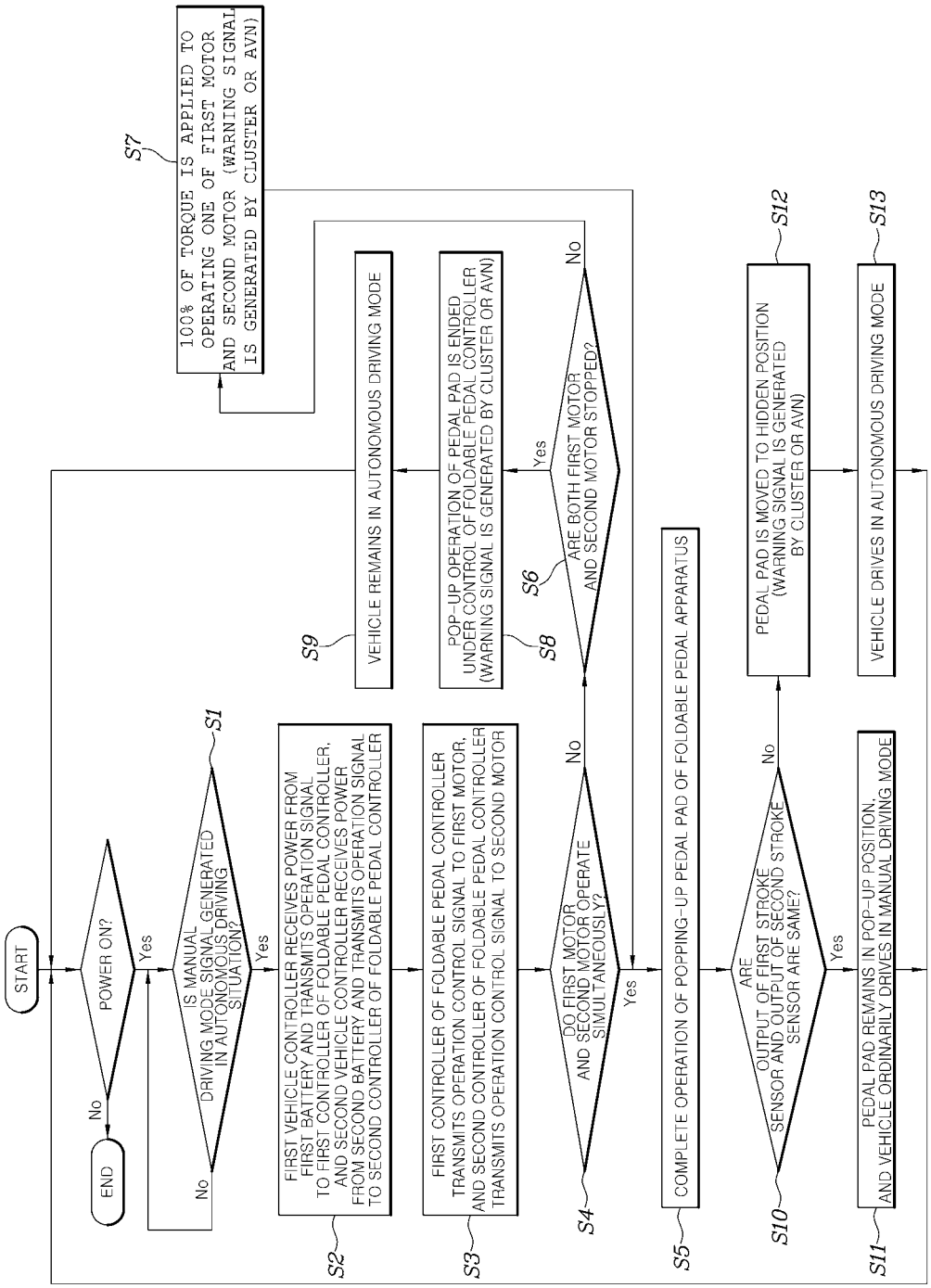

A control process according to the first embodiment of the present disclosure will be described with reference to FIG. 4.

In a situation in which the autonomous driving vehicle provided with the foldable pedal apparatus is in the autonomous driving mode, when a signal instructing the manual driving mode is generated by the operation the manual driving mode switch 12 in step S1, the first vehicle controller 31 receives power from the first battery 21 and transmits the operation signal to the first controller 131 of the foldable pedal controller 130 while the second vehicle controller 32 receives power from the second battery 22 and transmits the operation signal to the second controller 132 of the foldable pedal controller 130 in step S2.

In addition, in step S3, the first controller 131 of the foldable pedal controller 130 transmits the operation control signal to the first motor 141 and the second controller 132 of the foldable pedal controller 130 transmits the operation control signal to the second motor 142. In step S4, the first controller 131 and the second controller 132 of the foldable pedal controller 130 determine whether or not the first motor 141 and the second motor 142 operate simultaneously.

When the first motor 141 and the second motor 142 are determined to operate simultaneously in the step S4, the first motor 141 and the second motor 142 operate by sharing 50% of torque necessary for the operation of the pedal driving unit 150 under the control of the first controller 131 and the second controller 132 of the foldable pedal controller 130, and the support member 155 extends in response to the simultaneous operation of the first motor 141 and the second motor 142 to support the pivot member 156, thereby moving the pedal pad 120 of the foldable pedal apparatus to the pop-up position in step S5.

When the first motor 141 and the second motor 142 are determined not to operate simultaneously in the step S4, the foldable pedal controller 130 determines whether or not both the first motor 141 and the second motor 142 are in stopped positions in step S6.

When one motor of the first motor 141 and the second motor 142 is determined to be operating in the step S6, 100% of the torque is applied to the operating motor under the control of the foldable pedal controller 130, and also at this time, the pedal pad 120 of the foldable pedal apparatus is moved to the pop-up position in step S7.

In the situation of the step S7, one motor of the first motor 141 and the second motor 142 has broken or is malfunctioning. In this situation, a warning system of the vehicle may be operated under the control of the first vehicle controller 31 and the second vehicle controller 32 to alert the driver.

The warning system may be a warning light, a warning sound generator, a cluster, an audio video navigation (AVN) device, or the like. A warning signal generated by the warning system may include at least one of a visual warning signal, an audible warning signal, and a tactile warning signal.

In contrast, when none of the first motor 141 and the second motor 142 is determined to operate in the step S6, a control logic necessary for the pop-up operation of the pedal pad 120 is ended under the control of the foldable pedal controller 130 in step S8. At this time, in step S9, the warning system of the vehicle is operated and the vehicle remains in the autonomous driving mode.

After the pedal pad 120 of the foldable pedal apparatus is moved to the pop-up position in the step S5, when the pedal pad 120 is pivoted by the operation of the driver, the first controller 131 and the second controller 132 of the foldable pedal controller 130 determine whether or not the output of the first stroke sensor 161 and the output of the second stroke sensor 162 are the same in step S10.

When the output of the first stroke sensor 161 and the output of the second stroke sensor 162 are determined to be the same in the step S10, the pedal pad 120 remains in the pop-up position under the control of the first controller 131 and the second controller 132 of the foldable pedal controller 130 and the vehicle ordinarily drives in the manual driving mode in step S11.

In contrast, when the output of the first stroke sensor 161 and the output of the second stroke sensor 162 are determined to be different in the step S10, the pedal pad 120 is moved to the hidden position under the control of the first controller 131 and the second controller 132 of the foldable pedal controller 130 in step S12. At this time, the warning system of the vehicle is operated and the vehicle drives in the autonomous driving mode in step S13.

An operation stabilization system for a foldable pedal apparatus according to a second embodiment of the present disclosure will be described with reference to FIGS. 5 to 7.

Figure 5:
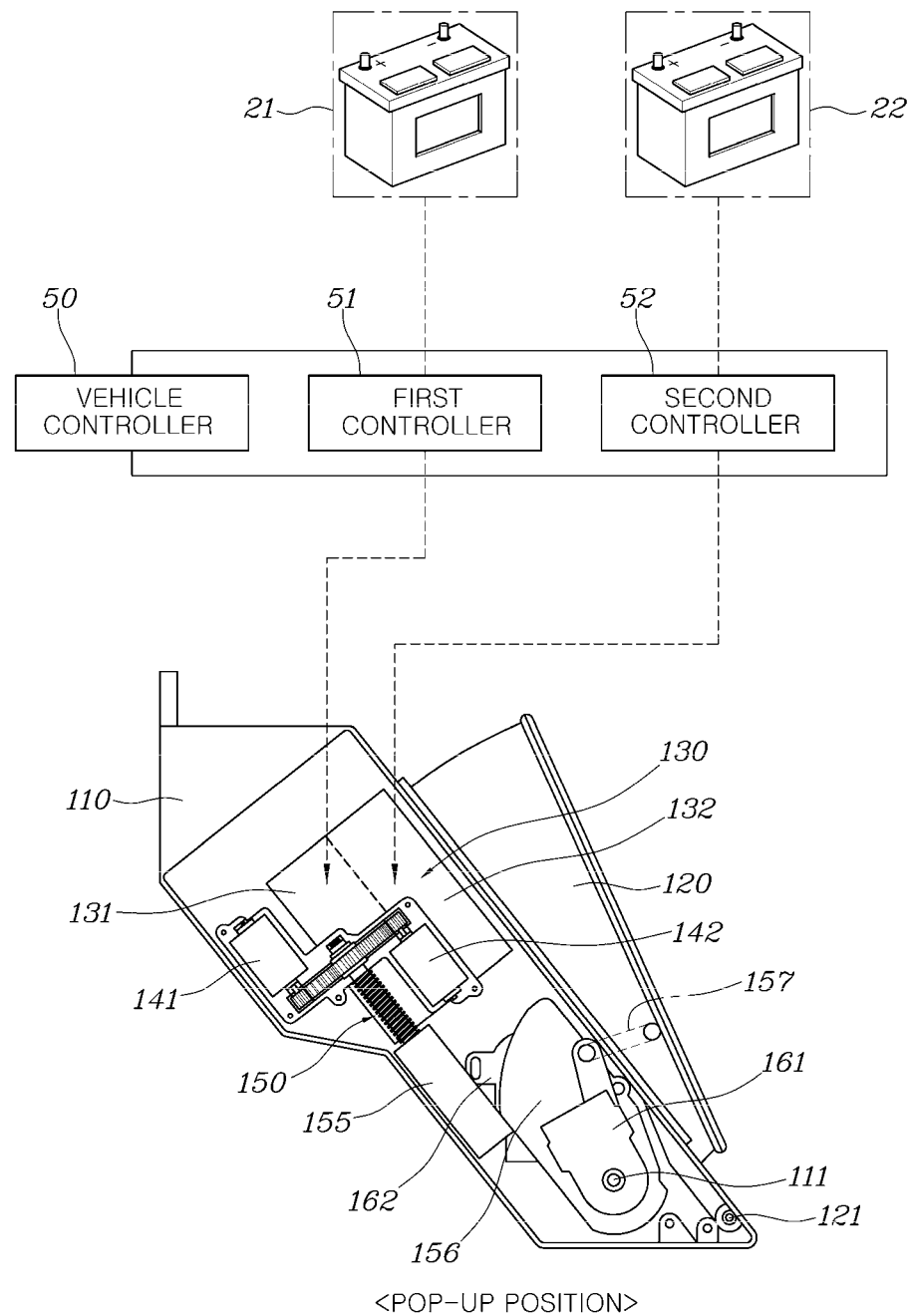
FIG. 5 is a diagram illustrating a schematic configuration of an operation stabilization system for a foldable pedal apparatus according to a second embodiment of the present disclosure.
Figure 6:
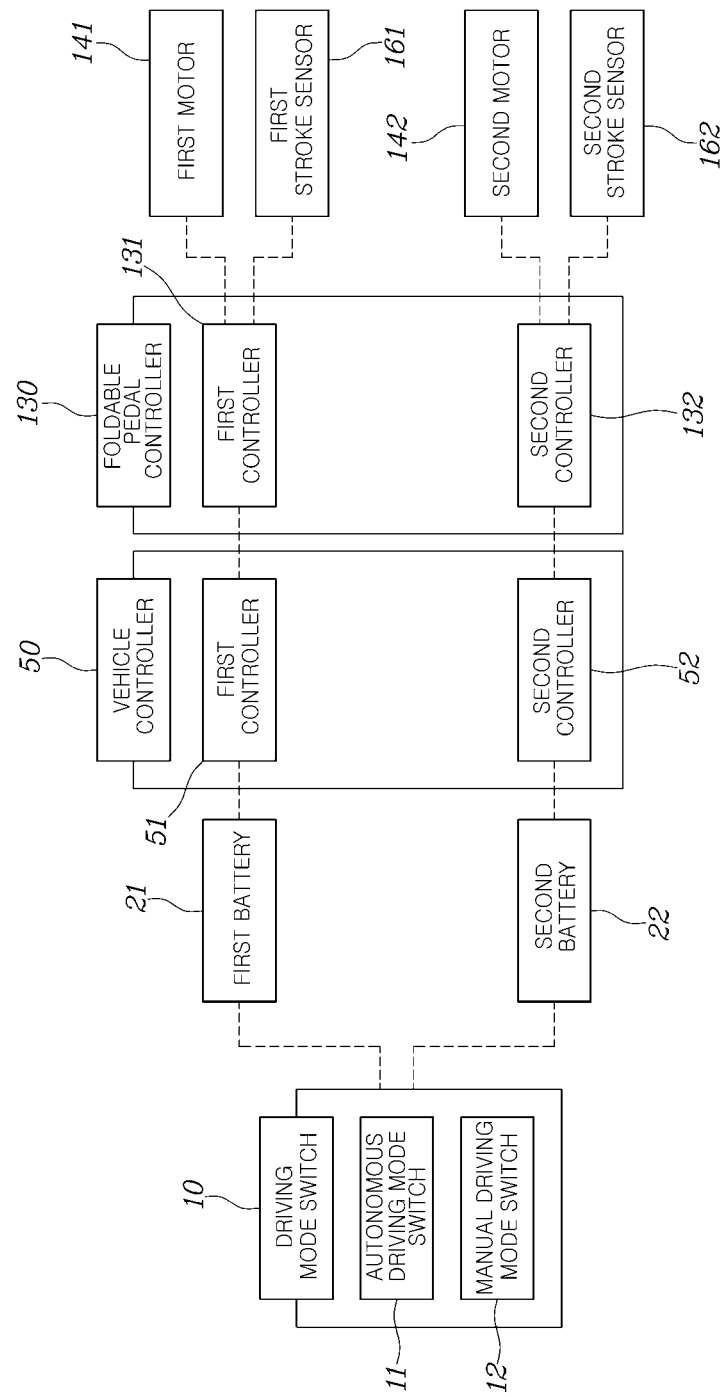
FIGS. 6 and 7 are a block diagram and a flowchart, respectively, illustrating the second embodiment of the present disclosure.
Figure 7:
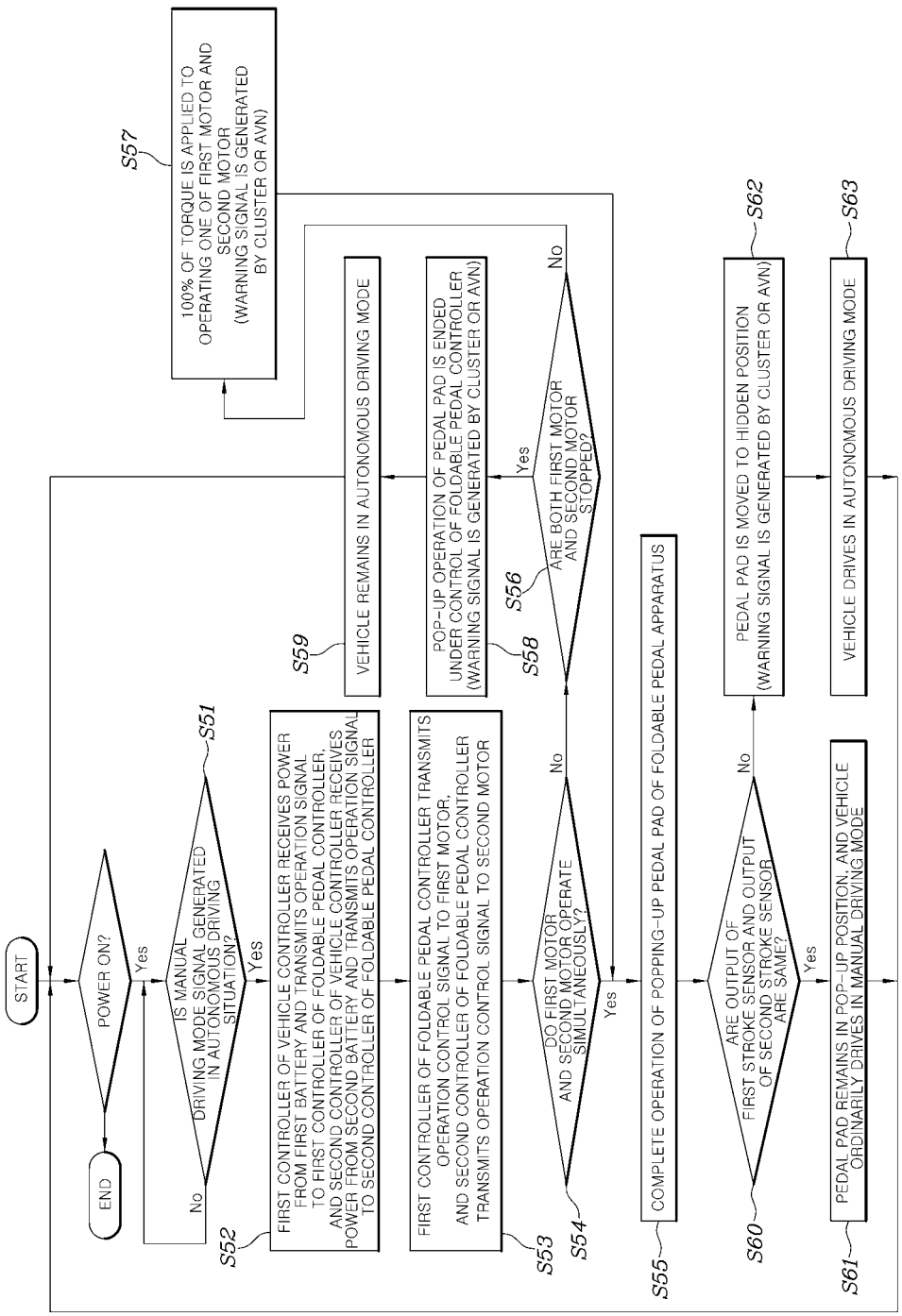

The components of the second embodiment of the present disclosure referring to FIGS. 5 to 7 are the same as those of the first embodiment described above with reference to FIGS. 1 to 4, except that a single vehicle controller is provided and the control area of the single vehicle controller is divided into a first controller and a second controller. The same components will be designated by the same reference numerals.

That is, the driving mode of the autonomous driving vehicle may be changed by the operation of the driving mode switch 10. The driving mode switch 10 may include the autonomous driving mode switch 11 and the manual driving mode switch 12.

The driving mode switch 10 is connected to a first battery 21 and a second battery 22 provided in the autonomous driving vehicle. The first battery 21 and the second battery 22 are connected to a vehicle controller 50 provided in the autonomous driving vehicle.

The vehicle controller 50 may be a single controller, with the control area thereof being divided into a first controller 51 and a second controller 52.

The first controller 51 transmits an operation signal by receiving power from the first battery 21, while the second controller 52 transmits an operation signal by receiving power from the second battery 22.

Control signals of the first controller 51 and the second controller 52 of the vehicle controller 50 are transferred to the foldable pedal apparatus.

The foldable pedal apparatus may be a foldable accelerator pedal device or a foldable brake pedal device. The configuration of the foldable pedal apparatus is the same as that of the foldable pedal apparatus according to the first embodiment.

That is, the foldable pedal apparatus may include: a pedal housing 110 fixedly disposed in a space below and in front of the driver's seat; a pedal pad 120 pivotably coupled to the pedal housing 110 and being operable by a foot of a driver; a foldable pedal controller 130 generating control signals by receiving the signals from the vehicle controller 50; a first motor 141 and a second motor 142 connected to the first battery 21 and the second battery 22 to receive power therefrom, respectively, each of the first motor 141 and the second motor 142 operating by receiving the control signal from the foldable pedal controller 130; a pedal driving unit 150 operating by receiving the power from the first motor 141 and the second motor 142, and when operating, driving the pedal pad 120 to pivot with respect to the pedal housing 110 so that the pedal pad 120 pops up or is hidden; and a first stroke sensor 161 and a second stroke sensor 162 connected to the first battery 21 and the second battery 22, respectively.

The pedal housing 110 has the shape of a hollow box, with the foldable pedal controller 130, the first motor 141 and the second motor 142, the pedal driving unit 150, and the like being disposed within the internal space thereof.

The pedal pad 120 may be an organ-type pad, with the bottom end thereof being pivotably coupled to the pedal housing 110 via a hinge pin 121, and the top end thereof being pivotable in a forward-backward direction about the hinge pin 121 on the bottom end.

The foldable pedal controller 130 may be a single controller, with the control area thereof being divided into a first controller 131 and a second controller 132.

The first controller 131 of the foldable pedal controller 130 receives the signal from the first controller 51 of the vehicle controller 50 and transmits an operation control signal to the first motor 141. The second controller 132 of the foldable pedal controller 130 receives the signal from the second controller 52 of the vehicle controller 50 and transmits an operation control signal to the second motor 142.

Each of the first motor 141 and the second motor 142 may be a rotary motor. The rotary motor may be a stepper motor. The first motor 141 and the second motor 142 may be configured to receive power from the first battery 21 and the second battery 22, respectively.

The pedal driving unit 150 includes: a first gear 151 coupled to the first motor 141; a second gear 152 coupled to the second motor 142; a common gear 153 connecting the first gear 151 and the second gear 152; a lead screw 154 coupled to the central portion of the common gear 153; a support member 155 screw-coupled to the lead screw 154 to extend and retract in the longitudinal direction of the lead screw 154 following the rotation of the lead screw 154; a pivot member 156 pivotably coupled to the pedal housing 110 and configured to be supported by the support member 155 when the support member 155 has extended and be released from being supported by the support member 155 when the support member 155 has retracted; and a connecting link 157 connecting the pivot member 156 and the pedal pad 120 to each other.

One end of the pivot member 156 is pivotably coupled to a fixed shaft 111 of the pedal housing 110. The pivot member 156 is connected to the pedal pad 120 via the connecting link 157. The pivot member 156 may be a hysteresis module able to generate hysteresis when the pedal pad 120 is operated by the driver.

The pedal pad 120 may be moved between a hidden position in which the pedal pad 120 has been inserted into the pedal housing 110 and a pop-up position in which the pedal pad 120 has extended from the pedal housing 110, in response to the pivoting of the pivot member 156 caused by the extending and retracting of the support member 155.

That is, when the first gear 151, the second gear 152, and the common gear 153 are rotated by the operation of the first motor 141 and the second motor 142, the lead screw 154 coupled to the common gear 153 rotates. Following the rotation of the lead screw 154, the support member 155 screw-coupled to the lead screw 154 extends and retracts in the longitudinal direction of the lead screw 154 while being guided by the pedal housing 110.

When the support member 155 has extended to be inserted between the pedal housing 110 and the pivot member 156, the support member 155 that has extended is in a position supporting the pivot member 156, and the pedal pad 120 has extended from the pedal housing 110 to be in the pop-up position. From this point in time, the pedal pad 120 may be operated by the driver (refer to Pop-up Position in FIG. 5.)

When the support member 155 has retracted so as to be released from the position supporting the pivot member 156, the pedal pad 120 pivots into the pedal housing 110, thereby moving to the hidden position. In this position, the pedal pad 120 is not operable by the driver (refer to the Hidden Position in FIGS. 1 and 2.)

A return spring is provided such that both ends thereof are supported on the pedal housing 110 and the pivot member 156. When the support member 155 retracts so as to be released from the position supporting the pivot member 156, the pivot member 156 is pivoted by the elastic force of the return spring, in a direction in which the pivot member 156 is inserted into the pedal housing 110. At this time, the pedal pad 120 connected to the pivot member 156 via the connecting link 157 is also pivoted to be inserted into the pedal housing 110, thereby moving to the hidden position.

The first stroke sensor 161 and the second stroke sensor 162 are fixedly coupled to left and right portions of the pedal housing 110, respectively. The first stroke sensor 161 and the second stroke sensor 162 are connected to the pedal pad 120 via links, respectively. When the pedal pad 120 is operated by the driver, the first stroke sensor 161 and the second stroke sensor 162 serve to detect an initial position (i.e. a return position) of the pedal pad 120. In addition, each of the first stroke sensor 161 and the second stroke sensor 162 may perform an assistance function of an APS or a BPS.

A control process according to the second embodiment of the present disclosure will be described with reference to FIG. 7.

In a situation in which the autonomous driving vehicle provided with the foldable pedal apparatus is in the autonomous driving mode, when a signal instructing the manual driving mode is generated by the operation the manual driving mode switch 12 in step S51, the first controller 51 of the vehicle controller 50 receives power from the first battery 21 and transmits the operation signal to the first controller 131 of the foldable pedal controller 130 while the second controller 52 of the vehicle controller 50 receives power from the second battery 22 and transmits the operation signal to the second controller 132 of the foldable pedal controller 130 in step S52.

In addition, in step S53, the first controller 131 of the foldable pedal controller 130 transmits the operation control signal to the first motor 141 and the second controller 132 of the foldable pedal controller 130 transmits the operation control signal to the second motor 142. In S54, the first controller 131 and the second controller 132 of the foldable pedal controller 130 determine whether or not the first motor 141 and the second motor 142 operate simultaneously.

When the first motor 141 and the second motor 142 are determined to operate simultaneously in the step S54, the first motor 141 and the second motor 142 operate by sharing 50% of torque necessary for the operation of the pedal driving unit 150 under the control of the first controller 131 and the second controller 132 of the foldable pedal controller 130, and the support member 155 extends in response to the simultaneous operation of the first motor 141 and the second motor 142 to support the pivot member 156, thereby moving the pedal pad 120 of the foldable pedal apparatus to the pop-up position in step S55.

When the first motor 141 and the second motor 142 are determined not to operate simultaneously in the step S54, the foldable pedal controller 130 determines whether or not both the first motor 141 and the second motor 142 are in stopped positions in step S56.

When one motor of the first motor 141 and the second motor 142 is determined to be operating in the step S56, 100% of the torque is applied to the operating motor under the control of the foldable pedal controller 130, and also at this time, the pedal pad 120 of the foldable pedal apparatus is moved to the pop-up position in step S57.

In the situation of the step S57, one motor of the first motor 141 and the second motor 142 has broken or is malfunctioning. In this situation, a warning system of the vehicle may be operated under the control of the first vehicle controller 31 and the second vehicle controller 32 to alert the driver.

The warning system may be a warning light, a warning sound generator, a cluster, an AVN device, or the like. A warning signal generated by the warning system may include at least one of a visual warning signal, an audible warning signal, and a tactile warning signal.

In contrast, when neither the first motor 141 nor the second motor 142 is determined to operate in the step S56, a control logic necessary for the pop-up operation of the pedal pad 120 is ended under the control of the foldable pedal controller 130 in step S58. At this time, in step S59, the warning system of the vehicle operates and the vehicle remains in the autonomous driving mode.

After the pedal pad 120 of the foldable pedal apparatus is moved to the pop-up position in the step S55, when the pedal pad 120 is pivoted by the operation of the driver, the first controller 131 and the second controller 132 of the foldable pedal controller 130 determine whether or not the output of the first stroke sensor 161 and the output of the second stroke sensor 162 are the same in step S60.

When the output of the first stroke sensor 161 and the output of the second stroke sensor 162 are determined to be the same in the step S60, the pedal pad 120 remains in the pop-up position under the control of the first controller 131 and the second controller 132 of the foldable pedal controller 130 and the vehicle ordinarily drives in the manual driving mode in step S61.

In contrast, when the output of the first stroke sensor 161 and the output of the second stroke sensor 162 are determined to be different in the step S60, the pedal pad 120 is moved to the hidden position under the control of the first controller 131 and the second controller 132 of the foldable pedal controller 130 in step S62. At this time, the warning system of the vehicle operates and the vehicle drives in the autonomous driving mode in step S63.

As set forth above, the operation stabilization system for a foldable pedal apparatus according to the present disclosure may significantly improve the operation stability using the independent first and second batteries 21 and 22, the independent first and second motors 141 and 142, and the two independent stroke sensors 161 and 162. In particular, the foldable pedal apparatus has the configuration able to perform a failsafe function, thereby preventing the risk of an accident that would be caused by a malfunction.

Although the specific embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. An operation stabilization system for a foldable pedal apparatus of a vehicle, the operation stabilization system comprising:
    a first battery and a second battery disposed in the vehicle;
    a first vehicle controller and a second vehicle controller receiving power from the first battery and the second battery, respectively, and transmitting operation signals, respectively;
    a foldable pedal controller disposed in the foldable pedal apparatus to generate control signals by receiving the signals from the first vehicle controller and the second vehicle controller;
    a first motor and a second motor disposed in the foldable pedal apparatus and connected to the first battery and the second battery to receive the power from the first and second batteries, respectively, wherein the first motor and the second motor respectively operate by receiving the control signals from the foldable pedal controller; and
    a pedal driving unit disposed in the foldable pedal apparatus, operating by receiving the power from the first motor and the second motor, and when operating, driving a pedal pad of the foldable pedal apparatus to pivot with respect to a pedal housing so that the pedal pad pops up or is hidden.

2. The operation stabilization system of claim 1, further comprising a first stroke sensor and a second stroke sensor disposed in the foldable pedal apparatus and connected to the first battery and the second battery, respectively.

3. The operation stabilization system of claim 2, wherein the foldable pedal controller comprises a single foldable pedal controller which includes a first controller and a second controller,
    wherein the first controller receives the signal from the first vehicle controller and transmits an operation control signal to the first motor and the second controller receives the signal from the second vehicle controller and transmits an operation control signal to the second motor.

4. The operation stabilization system of claim 3, wherein, when a manual driving mode signal is generated in an autonomous driving situation, the first vehicle controller receives the power from the first battery and transmits the operation signal to the first controller of the foldable pedal controller while the second vehicle controller receives the power from the second battery and transmits the operation signal to the second controller of the foldable pedal controller,
    wherein the first controller of the foldable pedal controller transmits the operation control signal to the first motor and the second controller of the foldable pedal controller transmits the control operation signal to the second motor, and wherein the pedal pad of the foldable pedal apparatus is moved to a pop-up position or remains in a hidden position depending on whether or not the first motor and the second motor operate.

5. The operation stabilization system of claim 4, wherein the first controller and the second controller of the foldable pedal controller determine whether or not the first motor and the second motor are operating, respectively, and wherein, when the first motor and the second motor operate simultaneously, the first motor and the second motor operate by sharing 50% of torque necessary for an operation of the pedal driving unit under control of the first controller and the second controller of the foldable pedal controller, and in response to the first motor and the second motor operating simultaneously, the pedal pad of the foldable pedal apparatus is moved to the pop-up position.

6. The operation stabilization system of claim 4, wherein the first controller and the second controller of the foldable pedal controller determine whether or not the first motor and the second motor are operating, respectively, and wherein, when one motor of the first motor and the second motor is operating, 100% of the torque is applied to the operating motor under control of the foldable pedal controller and the pedal pad of the foldable pedal apparatus is moved to the pop-up position.

7. The operation stabilization system of claim 6, wherein, when one motor of the first motor and the second motor is operating, a warning system of the vehicle is operated under control of the first vehicle controller and the second vehicle controller.

8. The operation stabilization system of claim 4, wherein the first controller and the second controller of the foldable pedal controller determine whether or not the first motor and the second motor are operating, respectively, and wherein, when neither the first motor nor the second motor is operating, a control logic necessary for a pop-up operation of the pedal pad is ended under control of the foldable pedal controller, a warning system of the vehicle is operated under control of the first vehicle controller and the second vehicle controller, and the vehicle remains in autonomous driving mode.

9. The operation stabilization system of claim 4, wherein, after the pedal pad of the foldable pedal apparatus is moved to the pop-up position, when the pedal pad is pivoted by being operated by a driver, the pedal pad remains in the pop-up position or is moved to the hidden position depending on output states of the first stroke sensor and the second stroke sensor.

10. The operation stabilization system of claim 9, wherein the first controller and the second controller of the foldable pedal controller determine the output states of the first stroke sensor and the second stroke sensor, wherein, when an output value of the first stroke sensor and an output value of the second stroke sensor are the same, the pedal pad remains in the pop-up position under control of the first controller and the second controller of the foldable pedal controller and the vehicle ordinarily drives in manual driving mode, and wherein, when the output value of the first stroke sensor and the output value of the second stroke sensor are different, the pedal pad is moved to the hidden position under control of the first controller and the second controller of the foldable pedal controller and the vehicle drives in autonomous driving mode.

11. The operation stabilization system of claim 1, wherein the pedal driving unit comprises:
a first gear coupled to the first motor;
a second gear coupled to the second motor;
a common gear connecting the first gear and the second gear;
a lead screw coupled to a central portion of the common gear;
a support member screw-coupled to the lead screw to extend and retract in a longitudinal direction of the lead screw following rotation of the lead screw;
a pivot member pivotably coupled to the pedal housing and configured to be supported by the support member when the support member has extended and be released from being supported by the support member when the support member has retracted; and
a connecting link connecting the pivot member and the pedal pad to each other.

12. The operation stabilization system of claim 11, wherein, when the support member has extended to support the pivot member, the pedal pad pivots to extend from the pedal housing, thereby moving to a pop-up position, and wherein, when the support member has retracted to be released from a position supporting the pivot member, the pedal pad pivots to be inserted into the pedal housing, thereby moving to a hidden position.

13. An operation stabilization system for a foldable pedal apparatus of a vehicle, the operation stabilization system comprising:
a first battery and a second battery disposed in the vehicle;
a vehicle controller comprising a first controller receiving power from the first battery and transmitting an operation signal and a second controller receiving power from the second battery and transmitting an operation signal;
a foldable pedal controller disposed in the foldable pedal apparatus and comprising a first controller generating a control signal by receiving a signal from the first controller of the vehicle controller and a second controller generating a control signal by receiving a signal from the second controller of the vehicle controller;
a first motor and a second motor disposed in the foldable pedal apparatus and connected to the first battery and the second battery to receive the power from the first and second batteries, respectively, wherein the first motor and the second motor respectively operate by receiving the control signals from the foldable pedal controller;
a pedal driving unit disposed in the foldable pedal apparatus, operating by receiving the power from the first motor and the second motor, and when operating, driving a pedal pad of the foldable pedal apparatus to pivot with respect to a pedal housing so that the pedal pad pops up or is hidden; and
a first stroke sensor and a second stroke sensor disposed in the foldable pedal apparatus and connected to the first battery and the second battery, respectively.

14. The operation stabilization system of claim 13, wherein the pedal driving unit comprises:
a first gear coupled to the first motor;
a second gear coupled to the second motor;
a common gear connecting the first gear and the second gear;
a lead screw coupled to a central portion of the common gear;

a support member screw-coupled to the lead screw to extend and retract in a longitudinal direction of the lead screw following rotation of the lead screw;

a pivot member pivotably coupled to the pedal housing and configured to be supported by the support member when the support member has extended and be released from being supported by the support member when the support member has retracted; and a connecting link connecting the pivot member and the pedal pad to each other.

15. The operation stabilization system of claim 13, wherein, when a manual driving mode signal is generated in an autonomous driving situation, the first controller of the vehicle controller receives the power from the first battery and transmits the operation signal to the first controller of the foldable pedal controller while the second controller of the vehicle controller receives the power from the second battery and transmits the operation signal to the second controller of the foldable pedal controller, the first controller of the foldable pedal controller transmits the operation control signal to the first motor and the second controller of the foldable pedal controller transmits the control operation signal to the second motor, and the pedal pad of the foldable pedal apparatus is moved to a pop-up position or remains in a hidden position depending on whether or not the first motor and the second motor operate.

16. The operation stabilization system of claim 15, wherein the first controller and the second controller of the foldable pedal controller determine whether or not the first motor and the second motor are operating, respectively, and when the first motor and the second motor operate simultaneously, the first motor and the second motor operate by sharing 50% of torque necessary for an operation of the pedal driving unit under control of the first controller and the second controller of the foldable pedal controller, and in response to the first motor and the second motor operating simultaneously, the pedal pad of the foldable pedal apparatus is moved to the pop-up position.

17. The operation stabilization system of claim 15, wherein the first controller and the second controller of the foldable pedal controller determine whether or not the first motor and the second motor are operating, respectively, and when one motor of the first motor and the second motor is operating, 100% of the torque is applied to the operating motor under control of the foldable pedal controller and the pedal pad of the foldable pedal apparatus is moved to the pop-up position.

18. The operation stabilization system of claim 15, wherein the first controller and the second controller of the foldable pedal controller determine whether or not the first motor and the second motor are operating, respectively, and when neither the first motor nor the second motor is operating, a control logic necessary for a pop-up operation of the pedal pad is ended under control of the foldable pedal controller, and the vehicle remains in autonomous driving mode.

19. The operation stabilization system of claim 15, wherein, after the pedal pad of the foldable pedal apparatus is moved to the pop-up position, when the pedal pad is pivoted by being operated by a driver, the pedal pad remains in the pop-up position or is moved to the hidden position depending on output states of the first stroke sensor and the second stroke sensor.

20. The operation stabilization system of claim 15, wherein the first controller and the second controller of the foldable pedal controller determine the output states of the first stroke sensor and the second stroke sensor, when an output value of the first stroke sensor and an output value of the second stroke sensor are the same, the pedal pad remains in the pop-up position under control of the first controller and the second controller of the foldable pedal controller and the vehicle ordinarily drives in manual driving mode, and when the output value of the first stroke sensor and the output value of the second stroke sensor are different, the pedal pad is moved to the hidden position under control of the first controller and the second controller of the foldable pedal controller and the vehicle drives in autonomous driving mode.

* * * * *